US012156058B2

(12) United States Patent
Laselva et al.

(10) Patent No.: US 12,156,058 B2
(45) Date of Patent: Nov. 26, 2024

(54) PERFORMING RADIO MEASUREMENTS OF DOWNLINK SIGNALS

(71) Applicant: Nokia Technologies Oy, Espoo (FI)

(72) Inventors: Daniela Laselva, Klarup (DK); Christian Rom, Aalborg (DK); Ingo Viering, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 393 days.

(21) Appl. No.: 17/730,581

(22) Filed: Apr. 27, 2022

(65) Prior Publication Data

US 2022/0361019 A1 Nov. 10, 2022

(30) Foreign Application Priority Data

Apr. 28, 2021 (FI) ..................................... 20215497

(51) Int. Cl.
*H04W 24/08* (2009.01)
*H04B 7/08* (2006.01)

(52) U.S. Cl.
CPC .......... *H04W 24/08* (2013.01); *H04B 7/0834* (2013.01)

(58) Field of Classification Search
CPC ............................. H04W 24/08; H04B 7/0834
USPC ........................................................ 370/460
See application file for complete search history.

(56) References Cited

U.S. PATENT DOCUMENTS

| 2018/0255472 | A1 | 9/2018 | Chendamarai Kannan et al. |
| 2019/0150133 | A1* | 5/2019 | Li .......................... H04W 24/10 375/224 |
| 2019/0306924 | A1 | 10/2019 | Zhang et al. |
| 2020/0107327 | A1 | 4/2020 | Wang et al. |
| 2020/0205012 | A1 | 6/2020 | Bengtsson et al. |
| 2020/0350976 | A1 | 11/2020 | Bai et al. |
| 2020/0358583 | A1 | 11/2020 | Ryu et al. |
| 2020/0412425 | A1 | 12/2020 | Laghate |
| 2021/0050666 | A1 | 2/2021 | Cirik et al. |

FOREIGN PATENT DOCUMENTS

| CN | 110537334 A1 | 12/2019 | |
| WO | WO 2019/193581 A2 | 10/2019 | |
| WO | WO 2020/089513 A1 | 5/2020 | |
| WO | WO-2020112336 A1 * | 6/2020 | ........... H04B 7/0404 |
| WO | WO 2021/074485 A1 | 4/2021 | |

OTHER PUBLICATIONS

R1-1906816, "On Beam Management Enhancement", 3GPP TSG RAN WG1 Meeting #97 (Year: 2019).*

(Continued)

*Primary Examiner* — Intekhaab A Siddiquee
(74) *Attorney, Agent, or Firm* — Lippes Mathias LLP (57) ABSTRACT

An apparatus, comprising: means for obtaining radio environment information related to at least one downlink signal received by a user equipment using at least one currently-active reception antenna panel of a plurality of selectively-activatable reception antenna panels; and means for reconfiguring at least one of the plurality of selectively-activatable reception antenna panels to be used for performing radio measurements of a downlink signal to be one of active and inactive in response to a variation in the radio environment information.

19 Claims, 6 Drawing Sheets

(56) References Cited

OTHER PUBLICATIONS

Qualcomm Inc, "Triggering Adaptation of UE Power Consumption Characteristics", R1-1813448, 3GPP TSG-RAN WG1 Meeting #95, Spokane, WA, Nov. 12-16, 2018, 17 pgs.
Intel Corporation. R1-1906816. On Beam Management Enhancement. Reno, USA, May 13-17, 2019, May 4, 2019, [retrieved on Jun. 11, 2021], [retrieved from https://www.3gpp.org/ftp/tsg_ran/WG1_RL1/TSGR1_97/Docs].
Menglei Zhang, et al. "ns-3 Implementation of the 3GPP MIMO Channel Model for Frequency Spectrum above 6 GH", arXiv:1702.04822v1 [cs.IT] Feb. 16, 2017, 8 pgs.

* cited by examiner

- T12: if (L1_RSRP_Cs_Bs_Ps* > threshold(d)) then move to state 2
- T21: if (sumoverNbeams ((L1_RSRP_Cs_Bn_Ps*) < threshold(d))) then move to state 1
- T32: if (sumoverNbeams ((L1_RSRP_Cs_Bn_Ps*) > threshold(d))) then move to state 3
- T32: if (sumoverNbeamsMpanels ((L1_RSRP_Cs_Bn_Pm*) < threshold(d))) then move to state 2
- T34: if (sumoverNbeamsMpanels ((L1_RSRP_Cs_Bn_Pm*) > threshold(d))) then move to state 4
- T43: if (sumoverNbeamsMpanels ((L1_RSRP_Cs_Bn_Pm*) < threshold(d))) then move to state 3

PERFORMING RADIO MEASUREMENTS OF DOWNLINK SIGNALS

The present application claims priority to Finland Application No. FI 20215497 filed Apr. 28, 2021.

TECHNICAL FIELD

Various example embodiments relate to an apparatus and method for performing radio measurements of downlink signals.

BACKGROUND

In some wireless telecommunication networks, both base stations and user equipment are expected to operate using "narrow" beams meaning that the base station operates using radiation patterns narrower than sector-wide beams. A base station beam covering a sector would be typically be of around 120° whereas a narrow beam would typically be of around 11° half power beam width or even lower. Likewise, the user equipment operates using radiation patterns narrower than omni-directional beams for example, for frequency range 2 (FR2) the most common half power beam width is a single patch (for a panel) of around 90°. The reasons for the beam-based operations depend on the need for an increased array/antenna gain to compensate for the higher path loss at mmWaves (e.g. at frequency range 2 or above), but also due to technological limitations. Some user equipment have multiple antenna panels, each of which then requires appropriate configuration.

There are two levels of mobility including beam-level and cell-level mobility e.g. in the 5th generation new radio (5G NR) system. Beam-level mobility (also referred to as beam management) is controlled by the network and aided by the user equipment's autonomous beam correspondence (at the initial access) and by user equipment's reporting of periodic level 1 Reference Signal Received Power (L1-RSRP) measurements (for user equipment in Radio Resource Control (RRC) Connected state) for selection of the serving beam in the serving cell. The user equipment may be configured to perform L1-RSRP measurements either using Synchronization Signal Block (SSB) or Channel State Information Reference Signal (CSI-RS) signals, and to report them periodically. The user equipment can also be configured to perform beam correspondence using either SSB or CSI-RS. As part of the beam management in RRC Connected state for the service cell, the base station keeps track of the reception beam used to receive the transmission of a given user equipment. This procedure is network controlled (i.e. the network can send a beam change command via Medium Access Control Control Element (MAC CE)) and user equipment assisted (i.e. the user equipment reports periodically the L1-RSRP of the N best beams to aid beam selection at the network). Whenever the beam tracking fails, the user equipment triggers the beam failure detection and recovery procedure, which similarly to the beam tracking procedures is only applicable to user equipment in RRC CONNECTED state. Cell-level mobility is also controlled by the network for user equipment in RRC Connected mode, aided by the user equipment reporting of event-triggered measurement (e.g. Event A3 "Neighbour becomes offset better than primary cell (PCell)") and may lead e.g. to handover decisions. In RRC Idle/Inactive state, the cell-level mobility decisions, which may lead to cell-reselections, are user equipment-based according to radio resource management (RRM) measurements and network defined measurement parameters (including thresholds and priorities), which can be cell/cell pair/frequency layer-specific. For RRC Idle/Inactive mode, cell-level mobility is controlled by the user equipment via cell-reselection decisions and assisted by the network, which provides cell-reselection parameters and information related to the neighbour cells' measurements.

Although techniques for managing antenna panels while supporting mobility exist, unexpected consequences can occur particularly in terms of a higher device modem power consumption. Accordingly, it is desired to provide an improved technique for effectively managing antenna panels.

BRIEF DESCRIPTION

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided an apparatus, comprising: means for obtaining radio environment information related to at least one downlink signal received by a user equipment using at least one currently-active reception antenna panel of a plurality of selectively-activatable reception antenna panels; and means for reconfiguring at least one of the plurality of selectively-activatable reception antenna panels to be used for performing radio measurements of a downlink signal to be one of active and inactive in response to a variation in the radio environment information.

The radio environment information may be obtained from at least one of: a sensor on the user equipment; the radio measurements of the at least one downlink signal received by the user equipment using the at least one currently-active reception antenna panel; and from information from a base station providing the at least one downlink signal.

The variation in the radio environment information may be derived from at least one of: a variation of signal quality of the at least one downlink signal received by the user equipment using the at least one currently-active reception antenna panel; and information from the sensor indicating at least one of a movement and a rotation of the user equipment and proximity of a user.

The variation in the radio environment information may be derived from at least one of: the variation of signal quality of the at least one downlink signal received by the user equipment using the at least one currently-active reception antenna panel; the information from the sensor; and from the information from a base station providing the at least one downlink signal and indicates that the user equipment is at least one of moving, rotating, has a signal-blocking object between the user equipment and a base station transmitting the at least one downlink signal, has a signal-blocking object proximate the user equipment and has a signal-blocking object proximate a base station transmitting the at least one downlink signal.

The signal quality of the at least one downlink signal received by the user equipment using the at least one currently-active reception antenna panel may comprise at least one of a reference signal received power, a reference signal received quality and a signal-to-interference ratio.

The means for reconfiguring may reconfigure the at least one of the plurality of selectively-activatable reception antenna panels between a plurality of different active/inactive states to vary at least one of a number of active reception antenna panels to be used for performing radio measurements and a number of downlink signals to be measured in response to the variation in the radio environment information.

The downlink signals may comprise at least one reference signal carried in at least one of a synchronization signal block and a channel state information reference signal.

The means for reconfiguring may reconfigure the at least one of the plurality of selectively-activatable reception antenna panels between a plurality of different ordered active/inactive states, wherein each higher-ordered active/inactive state configures at least one of an increased number of active reception panels and an increased number of downlink signals to be measured compared to a lower-order active/inactive state.

The means for reconfiguring may reconfigure the at least one of the plurality of selectively-activatable reception antenna panels to a higher-ordered antenna panel configuration state from the ordered plurality of antenna panel configuration states to configure the plurality of antenna panels to increase temporarily a number of downlink signals to be measured.

The means for reconfiguring may reconfigure the at least one of the plurality of selectively-activatable reception antenna panels to a higher-ordered antenna panel configuration state from the ordered plurality of antenna panel configuration states to increase temporarily a number of downlink signals to be measured.

The means for reconfiguring may reconfigure the at least one of the plurality of selectively-activatable reception antenna panels between the plurality of different ordered active/inactive states in response to the variation in the radio environment information indicating a change in signal quality of the at least one downlink signal received by the user equipment using the at least one currently-active reception antenna panel which is greater than a threshold amount.

The means for reconfiguring may reconfigure the at least one of the plurality of selectively-activatable reception antenna panels between adjacent of the plurality of different ordered active/inactive states in response to the variation in the radio environment information indicating a change in signal quality of the at least one downlink signal received by the user equipment using the at least one currently-active reception antenna panel which is greater than a threshold amount.

The threshold amount may differ depending on whether the at least one downlink signal received by a user equipment is transmitted by a serving or non-serving base station.

The apparatus may comprise means for varying the threshold amount based on a proximity to a serving base station.

The means for reconfiguring may reconfigure the at least one of the plurality of selectively-activatable reception antenna panels between the plurality of different ordered active/inactive states in response to the variation in the radio environment information indicating a change in a movement state of the user equipment.

The means for reconfiguring may reconfigure the at least one of the plurality of selectively-activatable reception antenna panels between adjacent of the plurality of different ordered active/inactive states in response to the variation in the radio environment information indicating a change in a movement state of the user equipment.

The movement state may comprise at least one of movement and rotation of the user equipment.

The means for reconfiguring may reconfigure the at least one of the plurality of selectively-activatable reception antenna panels between the plurality of different ordered active/inactive states in response to the variation in the radio environment information indicating a change in a presence of a signal-blocking object between the user equipment and a base station transmitting the at least one downlink signal.

The means for reconfiguring may reconfigure the at least one of the plurality of selectively-activatable reception antenna panels between adjacent of the plurality of different ordered active/inactive states in response to the variation in the radio environment information indicating a change in a presence of a signal-blocking object between the user equipment and a base station transmitting the at least one downlink signal.

The means for reconfiguring may reconfigure the at least one of the plurality of selectively-activatable reception antenna panels to a higher-ordered active/inactive state to increase a number of downlink signals to be measured in response to the variation in the radio environment information indicating a decrease in signal quality of the at least one downlink signal received by the user equipment using the at least one currently-active reception antenna panel.

The means for reconfiguring may reconfigure the at least one of the plurality of selectively-activatable reception antenna panels to a higher-ordered active/inactive state to increase a number of downlink signals to be measured in response to the variation in the radio environment information indicating a decrease in signal quality of the at least one downlink signal received by the user equipment using the at least one currently-active reception antenna panel for a time period.

The means for reconfiguring may reconfigure the at least one of the plurality of selectively-activatable reception antenna panels to a higher-ordered active/inactive state to increase a number of downlink signals to be measured using the at least one currently-active reception antenna panel in response to the variation in the radio environment information indicating that a signal-blocking object is near a base station providing the at least one downlink signal.

The means for reconfiguring may reconfigure the at least one of the plurality of selectively-activatable reception antenna panels to a higher-ordered active/inactive state to increase a number of active reception panels in response to the variation in the radio environment information indicating that the user equipment is rotating.

The means for reconfiguring may reconfigure the at least one of the plurality of selectively-activatable reception antenna panels to a higher-ordered active/inactive state to increase a number of active reception panels in response to the variation in the radio environment information indicating that the user equipment is rotating greater than a threshold amount.

The means for reconfiguring may reconfigure the at least one of the plurality of selectively-activatable reception antenna panels to a higher-ordered active/inactive state to increase a number of active reception panels in response to the variation in the radio environment information indicating that that a signal-blocking object is near the user equipment.

The means for reconfiguring may reconfigure the at least one of the plurality of selectively-activatable reception antenna panels to a higher-ordered active/inactive state to increase a number of downlink signals to be measured in response to the variation in the radio environment information indicating that the user equipment is moving.

The means for reconfiguring may reconfigure the at least one of the plurality of selectively-activatable reception antenna panels to a higher-ordered active/inactive state to increase a number of downlink signals to be measured in response to the variation in the radio environment information indicating that the user equipment is moving greater than a threshold amount.

The means for reconfiguring may reconfigure the at least one of the plurality of selectively-activatable reception antenna panels to a lower-ordered active/inactive state to decrease a number of downlink signals to be measured in response to the variation in the radio environment information indicating an increase in signal quality of the at least one downlink signal received by the user equipment using the at least one currently-active reception antenna panel.

The means for reconfiguring may reconfigure the at least one of the plurality of selectively-activatable reception antenna panels to a lower-ordered active/inactive state to decrease a number of downlink signals to be measured in response to the variation in the radio environment information indicating an increase in signal quality of the at least one downlink signal received by the user equipment using the at least one currently-active reception antenna panel for a time period.

The means for reconfiguring may reconfigure the at least one of the plurality of selectively-activatable reception antenna panels to a lower-ordered active/inactive state to decrease a number of downlink signals to be measured using the at least one currently-active reception antenna panel in response to the variation in the radio environment information indicating that no signal-blocking object is near a base station providing the at least one downlink signal.

The means for reconfiguring may reconfigure the at least one of the plurality of selectively-activatable reception antenna panels to a lower-ordered active/inactive state to decrease a number of active reception panels in response to the variation in the radio environment information indicating that the user equipment is not rotating.

The means for reconfiguring may reconfigure the at least one of the plurality of selectively-activatable reception antenna panels to a lower-ordered active/inactive state to decrease a number of active reception panels in response to the variation in the radio environment information indicating that the user equipment is rotating less than a threshold amount.

The means for reconfiguring may reconfigure the at least one of the plurality of selectively-activatable reception antenna panels to a lower-ordered active/inactive state to decrease a number of active reception panels in response to the variation in the radio environment information indicating that that no signal-blocking object is near the user equipment.

The means for reconfiguring may reconfigure the at least one of the plurality of selectively-activatable reception antenna panels to a lower-ordered active/inactive state to decrease a number of downlink signals to be measured in response to the variation in the radio environment information indicating that the user equipment is not moving.

The means for reconfiguring may reconfigure the at least one of the plurality of selectively-activatable reception antenna panels to a lower-ordered active/inactive state to decrease a number of downlink signals to be measured in response to the variation in the radio environment information indicating that the user equipment is moving less than a threshold amount.

The means for reconfiguring may reconfigure the at least one of the plurality of selectively-activatable reception antenna panels to an active/inactive state where a single downlink signal is to be measured from a serving base station on a single active reception panel in response to the variation in the radio environment information indicating at least one of: that the user equipment is at least one of not moving and not rotating; that no signal-blocking object is between the user equipment and a base station transmitting the at least one downlink signal; and an increase of the at least one downlink signal received by the user equipment using the at least one currently-active reception antenna panel.

The means for reconfiguring may reconfigure the at least one of the plurality of selectively-activatable reception antenna panels to an active/inactive state where multiple downlink signals are to be measured from a serving base station on a single active reception panel in response to the variation in the radio environment information indicating that the user equipment is not moving, that the user equipment is not rotating and that a signal-blocking object is proximate a base station transmitting the at least one downlink signal.

The means for reconfiguring may reconfigure the at least one of the plurality of selectively-activatable reception antenna panels to an active/inactive state where multiple downlink signals are to be measured from a serving base station on multiple active reception panels in response to the variation in the radio environment information indicating that the user equipment is not moving, that the user equipment is rotating and that a signal-blocking object is the user equipment.

The means for reconfiguring may reconfigure the at least one of the plurality of selectively-activatable reception antenna panels to an active/inactive state where multiple downlink signals are to be measured from multiple base stations on multiple active reception panels in response to the variation in the radio environment information indicating at least one of: the user equipment is at least one of moving and rotating; a signal-blocking object is between the user equipment and a base station transmitting the at least one downlink signal; and a reduction in signal quality of the at least one downlink signal received by the user equipment using the at least one currently-active reception antenna panel.

The radio environment information may be obtained from at least one of a sensor on the user equipment, the radio measurements of the at least one downlink signal received by the user equipment using the at least one currently-active reception antenna panel and from information from a base station providing the at least one downlink signal.

The means for obtaining may comprise circuitry configured to obtain and the means for reconfiguring may comprise circuitry configured to reconfigure.

The means may comprise: at least one processor; and at least one memory including computer program code, the at least one memory and computer program code being configured to, with the at least one processor, cause the performance of the apparatus.

According to various, but not necessarily all, embodiments of the invention there is provided a method, comprising: obtaining radio environment information related to at least one downlink signal received by a user equipment using at least one currently-active reception antenna panel of a plurality of selectively-activatable reception antenna panels; and reconfiguring at least one of the plurality of selectively-activatable reception antenna panels to be used for performing radio measurements of a downlink signal to be one of active and inactive in response to a variation in the radio environment information.

The radio environment information may be obtained from at least one of a sensor on the user equipment, the radio measurements of the at least one downlink signal received by the user equipment using the at least one currently-active reception antenna panel and from information from a base station providing the at least one downlink signal.

The variation in the radio environment information may be derived from at least one of: a variation of signal quality of the at least one downlink signal received by the user equipment using the at least one currently-active reception antenna panel; and information from the sensor indicating at least one of a movement and a rotation of the user equipment and proximity of a user.

The variation in the radio environment information may be derived from at least one of: the variation of signal quality of the at least one downlink signal received by the user equipment using the at least one currently-active reception antenna panel; the information from the sensor; and from the information from a base station providing the at least one downlink signal and indicates that the user equipment is at least one of moving, rotating, has a signal-blocking object between the user equipment and a base station transmitting the at least one downlink signal, has a signal-blocking object proximate the user equipment and has a signal-blocking object proximate a base station transmitting the at least one downlink signal.

The signal quality of the at least one downlink signal received by the user equipment using the at least one currently-active reception antenna panel may comprise at least one of a reference signal received power, a reference signal received quality and a signal-to-interference ratio.

The reconfiguring may comprise reconfiguring the at least one of the plurality of selectively-activatable reception antenna panels between a plurality of different active/inactive states to vary at least one of a number of active reception antenna panels to be used for performing radio measurements and a number of downlink signals to be measured in response to the variation in the radio environment information.

The downlink signals may comprise at least one reference signal carried in at least one of a synchronization signal block and a channel state information reference signal The reconfiguring may comprise reconfiguring the at least one of the plurality of selectively-activatable reception antenna panels between a plurality of different ordered active/inactive states, wherein each higher-ordered active/inactive state configures at least one of an increased number of active reception panels and an increased number of downlink signals to be measured compared to a lower-order active/inactive state.

The method may comprise reconfiguring the at least one of the plurality of selectively-activatable reception antenna panels to a higher-ordered antenna panel configuration state from the ordered plurality of antenna panel configuration states which configures the plurality of antenna panels to increase temporarily a number of downlink signals to be measured.

The method may comprise periodically reconfiguring the at least one of the plurality of selectively-activatable reception antenna panels to a higher-ordered antenna panel configuration state from the ordered plurality of antenna panel configuration states which configures the plurality of antenna panels to increase temporarily a number of downlink signals to be measured.

The reconfiguring may comprise reconfiguring the at least one of the plurality of selectively-activatable reception antenna panels between the plurality of different ordered active/inactive states in response to the variation in the radio environment information indicating a change in signal quality of the at least one downlink signal received by the user equipment using the at least one currently-active reception antenna panel which greater than a threshold amount.

The reconfiguring may comprise reconfiguring the at least one of the plurality of selectively-activatable reception antenna panels between adjacent of the plurality of different ordered active/inactive states in response to the variation in the radio environment information indicating a change in signal quality of the at least one downlink signal received by the user equipment using the at least one currently-active reception antenna panel which greater than a threshold amount.

The threshold amount may differ depending on whether the at least one downlink signal received by a user equipment is transmitted by a serving or non-serving base station.

The method may comprise varying the threshold amount based on a proximity to a serving base station.

The reconfiguring may comprise reconfiguring the at least one of the plurality of selectively-activatable reception antenna panels between the plurality of different ordered active/inactive states in response to the variation in the radio environment information indicating a change in a movement state of the user equipment.

The reconfiguring may comprise reconfiguring the at least one of the plurality of selectively-activatable reception antenna panels between adjacent of the plurality of different ordered active/inactive states in response to the variation in the radio environment information indicating a change in a movement state of the user equipment.

The movement state may comprise at least one of movement and rotation of the user equipment.

The reconfiguring may comprise reconfiguring the at least one of the plurality of selectively-activatable reception antenna panels between the plurality of different ordered active/inactive states in response to the variation in the radio environment information indicating a change in a presence of a signal-blocking object between the user equipment and a base station transmitting the at least one downlink signal.

The reconfiguring may comprise reconfiguring the at least one of the plurality of selectively-activatable reception antenna panels between adjacent of the plurality of different ordered active/inactive states in response to the variation in the radio environment information indicating a change in a presence of a signal-blocking object between the user equipment and a base station transmitting the at least one downlink signal.

The reconfiguring may comprise reconfiguring the at least one of the plurality of selectively-activatable reception antenna panels to a higher-ordered active/inactive state to increase a number of downlink signals to be measured in response to the variation in the radio environment information indicating a decrease in signal quality of the at least one downlink signal received by the user equipment using the at least one currently-active reception antenna panel.

The reconfiguring may comprise reconfiguring the at least one of the plurality of selectively-activatable reception antenna panels to a higher-ordered active/inactive state to increase a number of downlink signals to be measured in response to the variation in the radio environment information indicating a decrease in signal quality of the at least one downlink signal received by the user equipment using the at least one currently-active reception antenna panel for a time period.

The reconfiguring may comprise reconfiguring the at least one of the plurality of selectively-activatable reception antenna panels to a higher-ordered active/inactive state to increase a number of downlink signals to be measured using the at least one currently-active reception antenna panel in response to the variation in the radio environment information indicating that a signal-blocking object is near a base station providing the at least one downlink signal.

The reconfiguring may comprise reconfiguring the at least one of the plurality of selectively-activatable reception antenna panels to a higher-ordered active/inactive state to increase a number of active reception panels in response to the variation in the radio environment information indicating that the user equipment is rotating.

The reconfiguring may comprise reconfiguring the at least one of the plurality of selectively-activatable reception antenna panels to a higher-ordered active/inactive state to increase a number of active reception panels in response to the variation in the radio environment information indicating that the user equipment is rotating greater than a threshold amount.

The reconfiguring may comprise reconfiguring the at least one of the plurality of selectively-activatable reception antenna panels to a higher-ordered active/inactive state to increase a number of active reception panels in response to the variation in the radio environment information indicating that that a signal-blocking object is near the user equipment.

The reconfiguring may comprise reconfiguring the at least one of the plurality of selectively-activatable reception antenna panels to a higher-ordered active/inactive state to increase a number of downlink signals to be measured in response to the variation in the radio environment information indicating that the user equipment is moving.

The reconfiguring may comprise reconfiguring the at least one of the plurality of selectively-activatable reception antenna panels to a higher-ordered active/inactive state to increase a number of downlink signals to be measured in response to the variation in the radio environment information indicating that the user equipment is moving greater than a threshold amount.

The reconfiguring may comprise reconfiguring the at least one of the plurality of selectively-activatable reception antenna panels to a lower-ordered active/inactive state to decrease a number of downlink signals to be measured in response to the variation in the radio environment information indicating an increase in signal quality of the at least one downlink signal received by the user equipment using the at least one currently-active reception antenna panel.

The reconfiguring may comprise reconfiguring the at least one of the plurality of selectively-activatable reception antenna panels to a lower-ordered active/inactive state to decrease a number of downlink signals to be measured in response to the variation in the radio environment information indicating an increase in signal quality of the at least one downlink signal received by the user equipment using the at least one currently-active reception antenna panel for a time period.

The reconfiguring may comprise reconfiguring the at least one of the plurality of selectively-activatable reception antenna panels to a lower-ordered active/inactive state to decrease a number of downlink signals to be measured using the at least one currently-active reception antenna panel in response to the variation in the radio environment information indicating that no signal-blocking object is near a base station providing the at least one downlink signal.

The reconfiguring may comprise reconfiguring the at least one of the plurality of selectively-activatable reception antenna panels to a lower-ordered active/inactive state to decrease a number of active reception panels in response to the variation in the radio environment information indicating that the user equipment is not rotating.

The reconfiguring may comprise reconfiguring the at least one of the plurality of selectively-activatable reception antenna panels to a lower-ordered active/inactive state to decrease a number of active reception panels in response to the variation in the radio environment information indicating that the user equipment is rotating less than a threshold amount.

The reconfiguring may comprise reconfiguring the at least one of the plurality of selectively-activatable reception antenna panels to a lower-ordered active/inactive state to decrease a number of active reception panels in response to the variation in the radio environment information indicating that that no signal-blocking object is near the user equipment.

The reconfiguring may comprise reconfiguring the at least one of the plurality of selectively-activatable reception antenna panels to a lower-ordered active/inactive state to decrease a number of downlink signals to be measured in response to the variation in the radio environment information indicating that the user equipment is not moving.

The reconfiguring may comprise reconfiguring the at least one of the plurality of selectively-activatable reception antenna panels to a lower-ordered active/inactive state to decrease a number of downlink signals to be measured in response to the variation in the radio environment information indicating that the user equipment is moving less than a threshold amount.

The reconfiguring may comprise reconfiguring the at least one of the plurality of selectively-activatable reception antenna panels to an active/inactive state where a single downlink signal is to be measured from a serving base station on a single active reception panel in response to the variation in the radio environment information indicating at least one of: that the user equipment is at least one of not moving and not rotating; that no signal-blocking object is between the user equipment and a base station transmitting the at least one downlink signal; and an increase of the at least one downlink signal received by the user equipment using the at least one currently-active reception antenna panel.

The reconfiguring may comprise reconfiguring the at least one of the plurality of selectively-activatable reception antenna panels to an active/inactive state where multiple downlink signals are to be measured from a serving base station on a single active reception panel in response to the variation in the radio environment information indicating that the user equipment is not moving, that the user equipment is not rotating and that a signal-blocking object is proximate a base station transmitting the at least one downlink signal.

The reconfiguring may comprise reconfiguring the at least one of the plurality of selectively-activatable reception antenna panels to an active/inactive state where multiple downlink signals are to be measured from a serving base station on multiple active reception panels in response to the variation in the radio environment information indicating that the user equipment is not moving, that the user equipment is rotating and that a signal-blocking object is the user equipment.

The reconfiguring may comprise reconfiguring the at least one of the plurality of selectively-activatable reception antenna panels to an active/inactive state where multiple downlink signals are to be measured from multiple base stations on multiple active reception panels in response to the variation in the radio environment information indicating at least one of: the user equipment is at least one of moving and rotating; a signal-blocking object is between the user equipment and a base station transmitting the at least one downlink signal; and a reduction in signal quality of the at least one downlink signal received by the user equipment using the at least one currently-active reception antenna panel.

The radio environment information may be obtained from at least one of a sensor on the user equipment, the radio measurements of the at least one downlink signal received by the user equipment using the at least one currently-active reception antenna panel and from information from a base station providing the at least one downlink signal.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided. Some embodiments provide an arrangement where user equipment or devices have more than one selectively-activatable reception antenna panels. Each of those reception antenna panels may be individually activated. The currently-active reception antenna panels receive one or more downlink signals typically from serving and/or neighbouring base stations. The radio environment relating to those downlink signals can change or vary based typically on movement of the user equipment and/or the presence of so-called blockers that attenuate (typically temporarily) those downlink signals. The user equipment obtains information relating to that radio environment and uses that information to selectively activate or deactivate individual reception antenna panels which are used to perform measurements on the one or more downlink signals. For example, if the radio environment information indicates that the user equipment is moving and/or rotating and/or is suffering from poor signal quality in the downlink signals being measured (and hence the radio environment is expected to be poor) then multiple reception antenna panels may be activated for performing radio measurements of downlink signals from a serving base station and/or neighbouring base stations at the expense of consuming a relatively high amount of power to perform those radio measurements of the downlink signals. When the radio environment information indicates that the user equipment is not moving and/or not rotating and/or the signal quality of the downlink signals improves (and hence the radio environment is expected to be good) then one or more of the reception antenna panels can be the deactivated and/or the number of downlink signals measured by the currently active reception antenna panels reduced in order to reduce power consumption at the user equipment. In this way, the different panels of a multi-panel user equipment can be utilised to optimize the power consumption of the user equipment while still supporting mobility. A user equipment can therefore achieve user equipment power saving by reducing the measurement activity in the panel domain (e.g. RRM measurements): the user equipment would need to operate with a minimum number of active panels (and even a single panel) at all times for achieving power saving; if a single panel is active at the user equipment, the active panel of the user equipment will very likely be the best panel for the serving cell, in which the operations have to be optimized to ensure the highest radio and service quality; the user equipment could activate and use additional panel(s) only if required based on e.g. certain panel activation/switch triggers. Moreover, at some frequencies, directional beamforming is used and is very sensitive to blockers. Thus, an important trigger relates to the presence of blockers that appear to degrade the radio quality observed via the active panel(s). For example, the RSRP of the strongest beam of the serving cell when measured from the active panel can be affected (obstructed) temporarily by a vehicle driving by, human walking by, hand/finger. A single (e.g. moving) blocker would only affect a group of SSB beams most likely only covered by an antenna panel and the rest of beams and panels would remain unaffected. This impact may be only momentarily in some cases (may last only a fraction of a second). Some embodiment provide means for panel handling at the user equipment including means to detect the radio conditions the user equipment is operating within, in respect to the user equipment mobility and radio channel stationary properties and in turn, means to determine whenever it is safe to use reduced panel activity or not.

In some embodiments, the information about the radio environment can be obtained from one more sensors on the user equipment which may indicate that the user equipment is mobile and/or rotating. Information about the radio environment can also be obtained from the radio measurements of the downlink signal and typically from the signal quality of the downlink signal. This can be used to infer the proximity or otherwise of the user equipment to base stations, as well as the presence or not of blockers either near to the base stations or the user equipment. Typically, in order to simplify processing at the user equipment, a number of predefined states are used. These states relate to different radio environments and define which reception antenna panels should be activated and deactivated in each of those states. Typically, a higher-order state increases the number of currently-active reception antenna panels and/or the number of downlink signal to be measured resulting in an increase in power consumption compared to lower-order states which decreased the number of currently active reception antenna panels and/or decrease the number of downlink signals to be measured in order to reduce the power consumption of the user equipment. Information about the radio environment may also be provided by the network based on historic experience of user equipment in similar circumstances. The user equipment may periodically shift temporarily to a higher-order to state in order to collect measurements of an increased number of downlink signals and/or use an increased number of reception antenna panels in order to maintain mobility requirements and minimize mobility performance degradation (such as dropped connections).

Some embodiments provide a method for handling the selection of reception (Rx) antenna panels to be employed at the user equipment (UE) for performing radio measurements (for example, Radio resource management (RRM) measurements, Layer 1 Reference Signal Received Power (L1-RSRP) for reporting, Radio Link Monitoring (RLM) measurements, Beam Failure Detection (BFD) measurements and the like). Typical examples of radio measurements comprise Reference Signal Received Power (RSRP), Reference Signal Received Quality (RSRQ), and Signal-to-Interference and noise ratio (SINR). The radio measurements can be based on, for example, Synchronization Signal Block (SSB) and/or Channel-State Information Reference Signals (CSI-RS) and the like (for example, other channels could be used such as PDCCH), transmitted by the serving cell and/or neighbour cells. The selection of reception antenna (Rx) panels for performing the radio measurements is achieved by determining when it is safe to use a reduced Rx panel set (for example, a single panel or fewer than all of the UE antenna panels). Likewise, some embodiments provide a method for handling the selection of the number of downlink signals to measure and, determining when it is safe to reduce a number of downlink signals (for example, a single or fewer than all of the reference signals transmitted by a cell) to be measured for performing the radio measurements. Similarly, some embodiments provide a method for determining when a larger Rx panel set should be used and/or larger number of downlink signals should be used (i.e. measured) based on the UE using information about its radio environment to estimate its radio state. The minimization of the number of RX panels and/or the minimization of the number of downlink signals in use for radio measurements aims to maximize user equipment (UE) power saving and is done in an adaptive incremental manner to avoid mobility performance degradation.

In some embodiments, the UE adapts its panel selection/switching decision-flow using information about the surrounding conditions, based on its determination of which radio environment state (referred to hereinafter as simply as "state" or "radio state") it is operating in, and applying state-specific panel set selection criteria. This approach provides an efficient way for the UE to scale up and scale down the measurement rate and scope of measurements (by selecting the appropriate set of cell, Rx beam, and antenna panel), which allows for scaling going from the smallest rate/scope to the largest rate/scope in a gradually incremental fashion, with clearly defined incremental steps as needed based on the UE radio state. The UE is able to determine the (radio environment) state itself by, for example:

Evaluating sensor information (e.g. proximity sensor(s) detecting local blockers (i.e. signal obstructions close to the UE), location sensors detecting UE rotation and UE movement velocity, GPS information detecting UE velocity, etc.).

Using available radio measurements such as, for example, the value or the variation of RSRP, RSRQ, Signal-to-Interference and noise ratio (SINR), and the like.

Counting previous antenna panel measurements/switches (if no antenna panel switching is performed, or if other antenna panel measurements are never significant) and using a signal quality measurement such as, for example, RSRP, RSRQ, Signal-to-Interference and noise ratio (SINR), and the like to determine whether blockers are present close to the UE or the base station which cause changes in the signal quality measurements.

Any other method, as set out below.

Non-limiting example ordered, hierarchical active/inactive states and corresponding actions related to the panel(s) selection are:

State 1 (lowest state): Static UE with no radio state variation due to surrounding blockers and no rotation. In this state, the UE uses a maximum power saving mode (for example, the UE only decodes the best SSB beam transmitted by the serving cell's transmission and reception point (TRP) on the currently-active antenna panel).

State 2: Static UE with no rotation and with a blocker close to the base station (gNB). In this state, the UE measures multiple SSB beams from the serving TRP on the currently-active antenna panel.

State 3: Static UE with rotation and/or with a blocker close to UE. In this state, the UE listens and measures using additional UE antenna panels than the currently-active antenna panel.

State 4 (highest state): Mobile UE having non-stationary/non-static (variable) radio state. This state could be due to UE mobility and/or rotation, and/or other factors causing radio channel state to be variable. In this state, the UE listens and measures using multiple panels most of the time (i.e. no/very limited power saving can be achieved as that would compromise mobility performance).

In some embodiments, the network can assist and determining the state can be made faster and more reliable by the UE interacting with the network. A main advantage of this approach is that the network can learn the expected radio environment from historic information, i.e. from previous UEs with similar properties (e.g. similar location, similar service, similar type of UE). The learning can be based on:

Measurements of the radio environment on the network side (reported L1/L3 RSRPs, frequency of beam switches/handovers, etc.).

Information received from the UEs. In the simplest case, the UEs report their radio environment state to the network, the network stores and processes the information, and then forwards the information to future UE (which benefit from having this information earlier).

Figure 1:
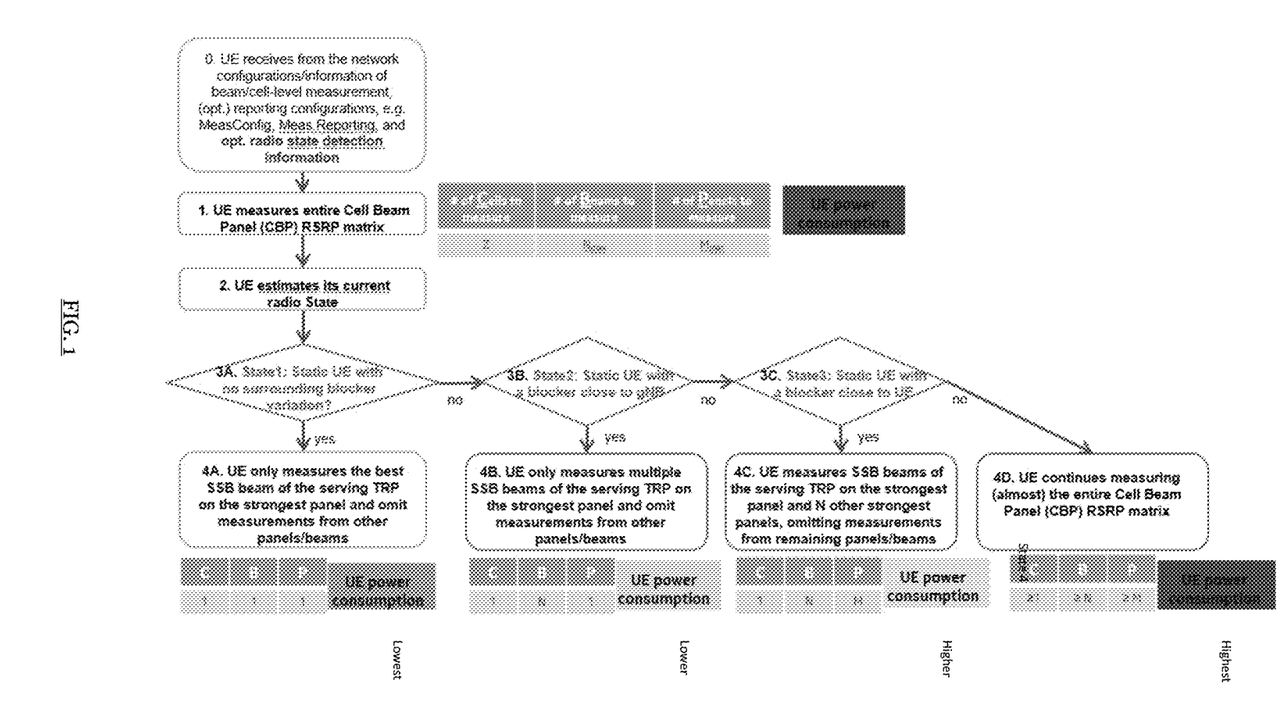
FIG. 1 is a flow chart illustrating operation of a user equipment implementing incremental changes in antenna panel received signal quality measurement activity based on the estimated radio environment state according to one embodiment.

Irrespective how the network retrieves the information on the radio environment, it may send assistance information to the UE, either as a pure information, or as a (mandatory) configuration, or as a recommendation which leaves it up to the UE whether or not to make use of this information. The assistance information may be signalled to the UE via Radio resource control (RRC) or Medium Access Channel (MAC) signalling. The assistance information may consist the measurements (e.g. beam/cell/panel switches), or it may also be an indication of the radio environment state (as received from previous UEs, and/or derived from the measurements).
Example Operation FIG. 1 is a flow chart illustrating operation of a UE implementing incremental changes in antenna panel received signal quality measurement activity based on the estimated radio environment state according to one embodiment.

At Step 1, initially, the UE explores the entire Cell Beam Panel (CBP) RSRP matrix. That is to say that the UE records the signal quality for all cells, for all beams, on all panels to obtain information on the radio environment.

At Step 2/3, the UE estimates the current radio environment "state" in which it is operating, based on performing the best matching of the observed radio quality measurements (or estimates), optionally together with the other sensor information about the movement of the UE and/or the presence of objects that may act as local blockers to one of the pre-defined "states". This can be done by comparing the RSRP matrix against pre-defined thresholds for each state, optionally together with the other sensor information. This may be further enhanced based on information provided by the network as radio state detection information (in Step 0, if it was received).

At Step 4, the UE selects the appropriate panel received signal quality measurement configuration for that radio state. If the UE is determined to be in any of states 1, 2 or 3, then this results in reduced antenna panel signal quality measurement activity, which reduces UE power consumption. If the UE is determined not to be in any of states 1, 2 or 3, then this does not result in reduced antenna panel signal quality measurement activity, which does not reduce UE power consumption.

The UE undergoes ongoing re-evaluation of the radio state. While reduced antenna panel measurement activity is enabled ("true") at the UE (i.e. the UE is currently in any of states 1, 2, or 3), the UE monitors for a radio state change by continuing to match the observed radio quality measurements (or estimates), optionally together with the other sensor information about the movement of the UE and/or the presence of objects that may act as local blockers to one of the pre-defined "states" to determine whether any change to the current panel measurement activity (e.g. increase or decrease) can be applied. Likewise, if the UE is in a state of maximum power consumption, it will monitor whether a change takes place that allows it to move to a power saving state. Typically, once the initial state is determined, then the UE will only shift to an adjacent state following a suitable change to the radio state. For example, a UE in state 1 can only transition to state 2; a UE in state 2 can only transition to state 1 or 3; a UE in state 3 can only transition to state 2 or 4; and a UE in state 4 can only transition to state 3.

Figure 2:
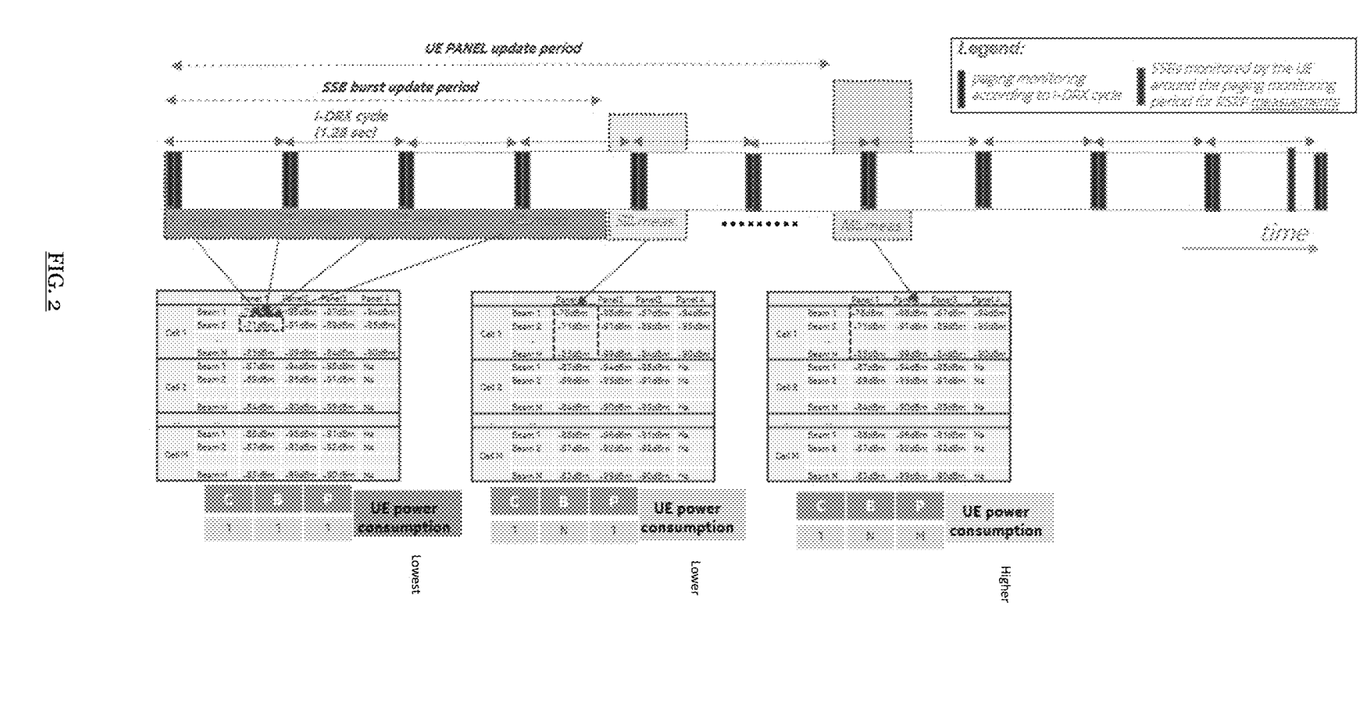
FIG. 2 illustrates example timing and antenna panel configuration of the user equipment according to one embodiment.

The UE monitors for radio state change by, for example: determining (significant) changes in the serving TRP's best beam(s)/panel(s) that are currently monitored (see below), and/or exploring time to time (at least part of) the Cell Beam Panel (CBP) RSRP matrix that is omitted during the reduced activity period as illustrated in FIG. 2.

The periodic and temporarily exploration could be done in an increasing manner, e.g.:
  If only one beam is monitored, the number of beams to be measured can be increased.
  If only a panel is monitored, the number of panels to be monitored can be increased.

Equally, the periodic exploration could be done in a complete manner where the entire CBP RSRP matrix can be periodically updated. This would involve a full scan of all panels and all SSB beams. For some UE which are only able to have 1 antenna panel active at a time, the scan would require 3-4 round robin panel scans. For other UE which are able to have multiple antenna panels active at a time, this could be done without the round robin panel scans.

The period for the exploration could be based on the absolute value of the channel quality on the serving beam measured from the serving panel and/or based on its delta (increase/decrease rate) in a given period. For example, if the absolute value is lower and/or the delta indicates a reduction, then the period can be set to a shorter value and vice-versa. Alternatively or additionally, the period for the exploration could be based on the requirement related to a cell detection delay.

For example, as illustrated in FIG. 2, the UE is operating in state 1 and so is only normally measuring the signal quality of the best SSB beam of the serving TRP on the currently-active antenna panel, where the best SSB beam is defined at the SSB whose corresponding SS-RSRP is the highest. This happens periodically and the entry for that beam in the matrix is updated, no other measurements are made. However, in this example, on every 5th measurement, the UE temporarily switches to operating in state 2, where the signal quality of all the SSB beams of the serving TRP on the currently-active antenna panel are measured and those entries in the matrix are updated, no other measurements are made. Likewise, every Nth measurement, the UE temporarily switches to operating in state 3, where the signal quality of all the SSB beams of the serving TRP on all the antenna panels are measured and those entries in the matrix are updated, no other measurements are made. It will be appreciated that temporary switches to operating in state 4 can be made, where the signal quality of all the SSB beams of the serving and any neighbouring cells' TRP are measured by all the antenna panels and those entries in the matrix are updated. This enables the UE to determine whether a significant change in radio state has occurred and/or to meet mobility delay requirements.

In addition, the UE may evaluate sensor information (as set out above). Also, the UE may consult RF wideband measurements, which require much less energy.

Figure 3:
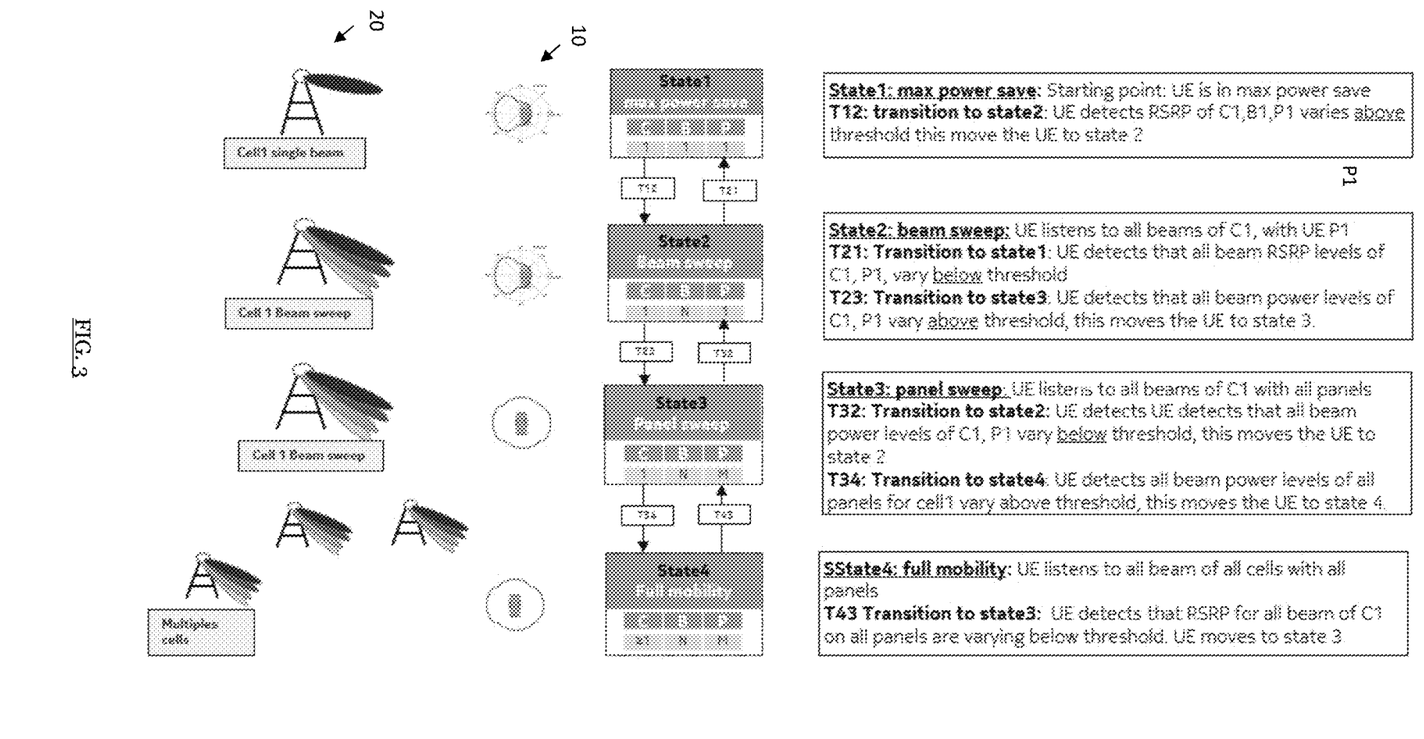
FIG. 3 illustrates an example implementation where a user equipment determines whether a radio state change is required based on observed changes in the performed measurements made according to the current radio state.

FIG. 3 illustrates an example implementation where a UE 10 determines whether a radio state change is required based on observed changes in the performed measurements made according to the current radio state.

In this example, the UE 10 is initiated into State 1, a "maximum power save" state. It will be appreciated that the initial state of the UE 10 can be also different to State 1. The state can be based e.g. on the absolute value of the channel quality on the serving beam measured from the serving panel. For example, if such an absolute value is lower than a UE internal threshold, the initial state of the UE 10 can be State 4. It will be appreciated that the UE 10 could be initiated into any other state, with this either being pre-defined (typically initiating into State 4) or by matching to the radio state as set out with reference to FIG. 1 above.

In state 1 only the RSRP of the Serving Cell, Serving Beam of the serving base station 20 is monitored by the UE's serving antenna panel P1 (this is denoted in the figure by showing the number of monitored cell (C), Beam (B) and Panel (P), which is: C=1, B=1, P=1).

State transition condition T12: the UE 10 will then transition to state 2 if the monitored RSRP varies above a threshold in dB (preferably for or within a time period) that could be either fixed or distance dependent which indicates that the signal quality is decreasing.

State 2 is a "beam sweep state", the UE 10 listens to all beams of the serving cell, with the UE serving antenna panel only (C=1, B=N, P=1).

State transition condition T21: the UE 10 will transition to state 1 if the UE detects that all or a group of the connected cell SSB beams RSRPs are below a threshold in dB (preferably for or within a time period) that could be either fixed or distance dependent which indicates that the signal quality is increasing.

State transition condition T23: the UE 10 will transition to state 3 if the UE detects that all or a group of the connected cell SSB beams RSRPs are above a threshold in dB (preferably for or within a time period) that could be either fixed or distance dependent which indicates that the signal quality is decreasing.

State 3 is a "panel sweep state", the UE 10 listens to all beams of the serving cell, with all antenna panels of the UE (C=1, B=N, P=M).

State transition condition T32: the UE 10 will transition to state 2 if the UE 10 detects that all or a group of serving cell beams, measured with serving panels, RSRPs are below a threshold in dB (preferably for or within a time period) that could be either fixed or distance dependent which indicates that the signal quality is increasing.

State transition condition T34: the UE 10 will transition to state 4 if the UE 10 detects that all or a group of serving cell beams, measured with all panels, RSRPs are above a threshold in dB (preferably for or within a time period) that could be either fixed or distance dependent which indicates that the signal quality is decreasing.

State 4 is a "full mobility state", the UE 10 listens to all beams of all cells from all base stations with all panels of the UE (C=>1, B=N, P=M).

State transition condition T43: the UE 10 will transition to state 3 if the UE 10 detects that all or a group of serving cell beams, measured with all panels, RSRPs are below a threshold in dB that could be either fixed or distance dependent which indicates that the signal quality is increasing.

Figure 4:
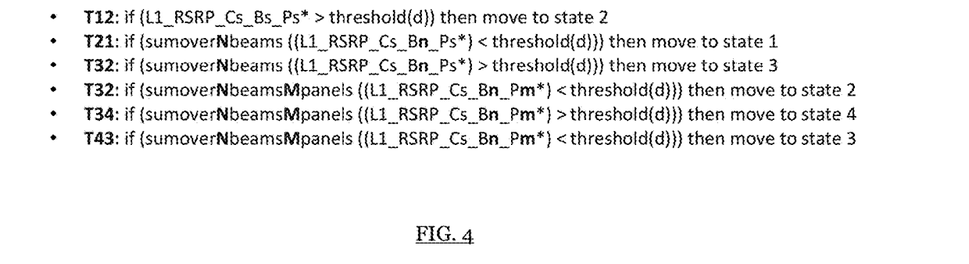
FIG. 4 shows example pseudo code to determine the state transition.

FIG. 4 shows example pseudo code to determine the state transition explained above.

Figure 5:
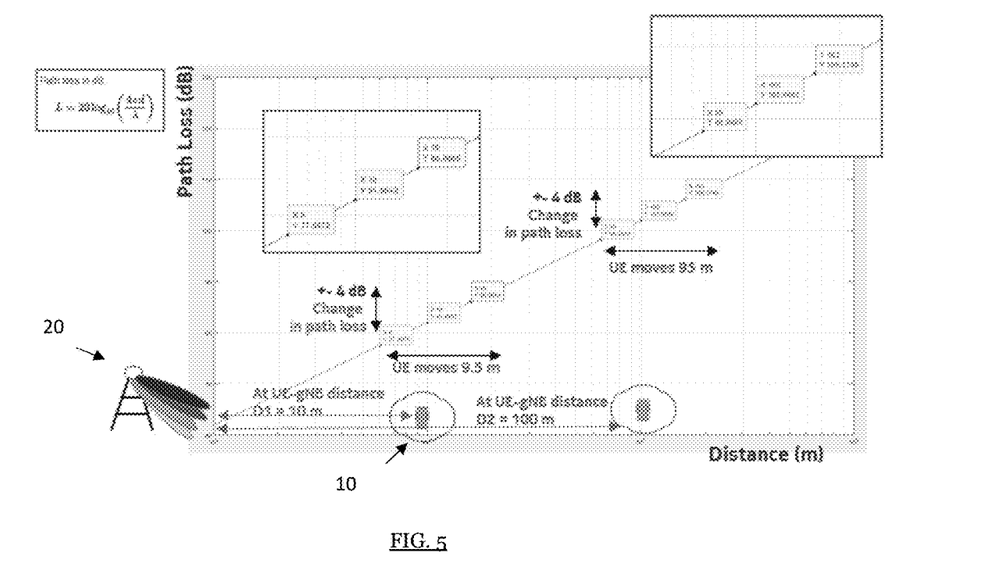
FIG. 5 illustrates how the radio state change thresholds could depend on the distance between the user equipment and base station.

Furthermore, as set out above, the radio state change thresholds could depend on the UE 10 distance to the gNodeB 20 (which could be estimated from the RSRP). This distance-dependent effect is shown in FIG. 5. Therefore, for the transition state determination discussed above, the UE 10 could use a fixed threshold RSRP comparison method or a variable distance-based method to determine the state transition as mentioned earlier.

In the fixed threshold RSRP comparison method, the single value or group of RSRP values variation over time will be compared to a predefined fixed threshold. If the single value or a majority of the values in the group are above or below the threshold, the state transition condition is valid, else it is false. The RSRP values can be filtered in order to avoid too many false detections and to smooth fast fading. A hysteresis can also be assumed to further strengthen false detection avoidance.

In the distance-based threshold method, this works in a similar manner as the fixed threshold method with the difference that the threshold value would depend on the UE 10 to gNB 20 distance. Table 1 shows examples of thresholds for different UE distances: close, medium and long range with 6, 4, 2 dB thresholds, for example.

TABLE 1

| UE-gNB distance d (metres) | Threshold (dB) |
|---|---|
| 0-40 | 6 dB |
| 40-100 | 4 dB |
| >100 | 2 dB |

Network Assistance

The network can provide radio environment information to help in the determination of "radio environment state" to aid the UE estimate. Although, the network may not be aware of UE's panel P1-P4 selection, and thereby not aware of blockers close to UE 10 and rotation, the network may be aware of/acquire other information relevant for the radio state estimate, for instance, the frequency of SSB changes and cell changes in a given area (from the past/previous UEs). This network information is not available inside the UE 10. Providing this apriori information to the UE 10 will allow more a reliable "radio state detection".

The network may provide information such as:

Expected/worst case cell changes per minute.

Expected/worst case beam/SSB changes per minute.

Urgency of cell change or beam/SSB changes ('0' indicating relaxed urgency, '1' indicating maximum urgency, although values in between are possible).

UE Behaviour:

The network may indicate relaxed urgency/frequency of beam changes. This is because no blockers are close to gNB 20, actions as 4A/state 1 or 3C/state 3 (see FIG. 1). Measuring other SSBs is less relevant, the UE 10 can search/measure more on other panels and/or neighbouring cells.

The network may indicate high urgency/frequency of beam changes. This is because blockers are close to gNB 20, actions as 4A/case 2 (see FIG. 1). Measuring other SSBs is relevant, these should be measured often.

The network indicates relaxed urgency/frequency of cell changes. This is because of static UE 10, actions as 4A-4C (see FIG. 1). Measuring neighbouring cells are less relevant, these should be measured often.

The network indicates high urgency/frequency of cell changes. This is because of dynamic UE 10, actions as 4D (see FIG. 1). Measuring neighbouring cells is less relevant, the UE 10 can search/measure more on other panels and/or neighbouring cells.

Figure 6:
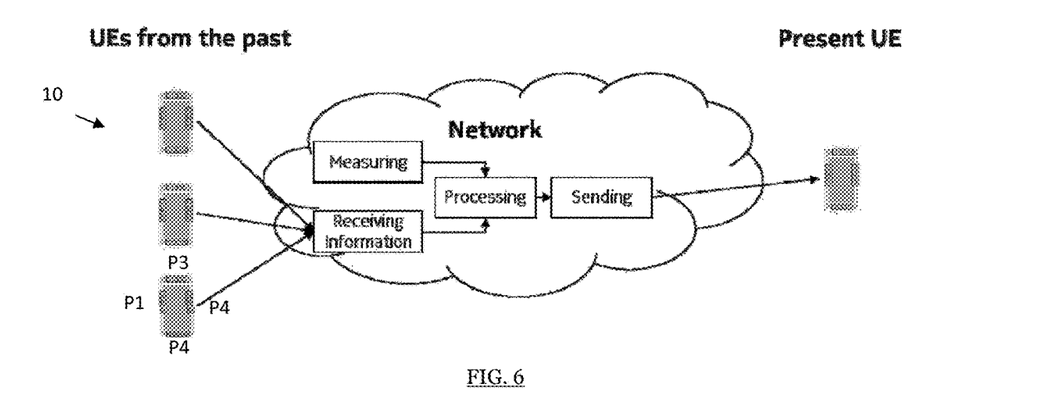
FIG. 6 illustrates network assistance based on historic information.

FIG. 6 illustrates an example interaction with the network which could be a base station (e.g. gNB 20), a central unit (gNB-CU), or any other central node collecting information for optimization (e.g. ORAN-RIC). The UE 10 may report information about their radio environment state to the network. The network may perform its own measurements of the radio environment state (e.g. frequency of beam/cell changes, L1/L3 RSRPs, etc.). The network may process the measurements and the information received by the UEs 10 and generate an indication of the radio environment state and provide assistance information to the UE 10. The network sends this assistance information as an indication to the UE 10, which helps the UE 10 to determine the radio environment state. The assistance information may include: an indication of the frequency of beam/cell changes; and/or a direct indication of the radio environment state. The UE may consider the indication when determining the radio environment state and adapt its antenna panel selection P1-P4 as described above.

Figure 7A:
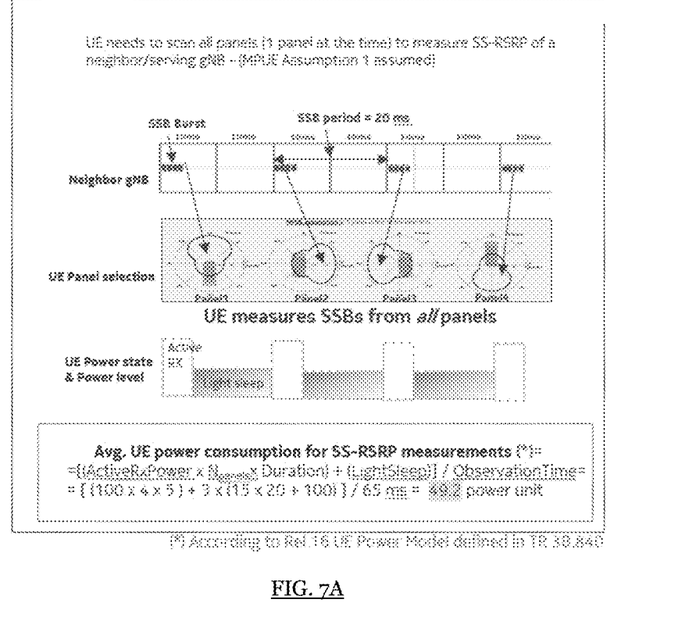
FIGS. 7A-7B illustrate power saving gains.
Figure 7B:
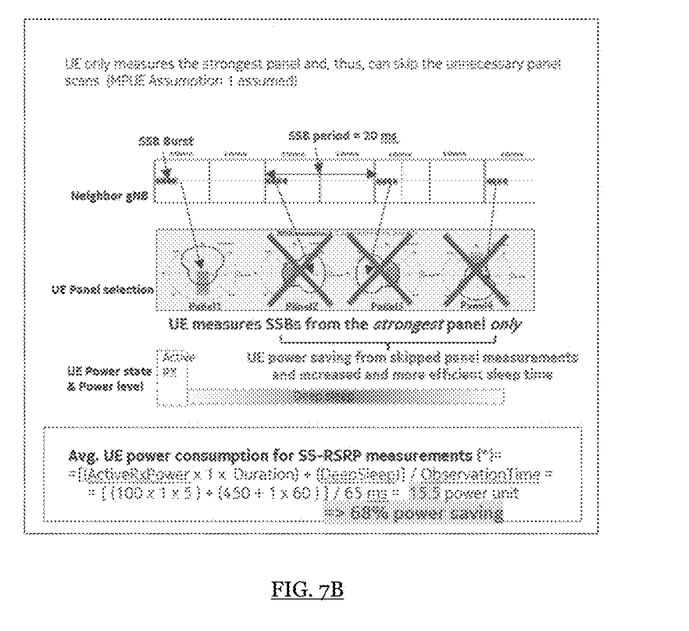

A key advantage of embodiments is enabling a UE 10 power saving gain without compromising mobility performance. The achievable gains are shown in FIG. 7 for a multiple panel UE 10 with 4 antenna panels P1-P4. As can be seen in FIG. 7B, a 68% power saving is obtained when 1 active panel out of 4 can be used compared with using all 4 panels P1-P4 in FIG. 7A.

Mobility Performance

Consider now an example of a dual-panel UE 10 which measures the serving cell (denoted "s") from antenna panel P1 and a target cell (denoted "t") from antenna panel P2, where event A3 based handover (HO) is adopted.

Figure 9:
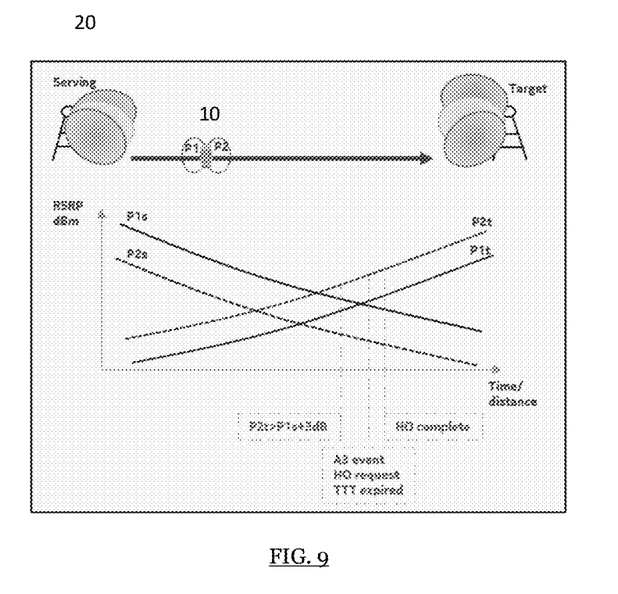
FIG. 9 shows measurements when moving from a Serving to Target cell.

In FIG. 9, the serving cell is denoted as "s", whereas the target cell is denoted as "t". The RSRP measurements from a UE 10 with 2 panels: Panel 1 (P1) and Panel 2 (P2) are shown as the UE 10 moves from the Serving towards the Target cell.

Figure 8:
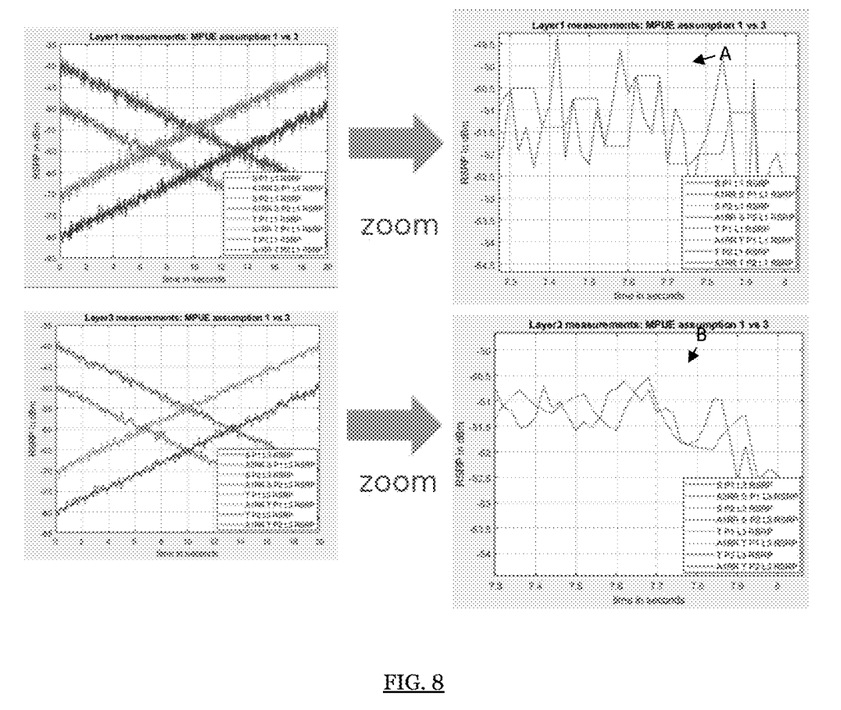
FIG. 8 shows a simulation example of RSRP measurements for a dual-panel user equipment moving from a Serving to Target cell.

FIG. 8 shows a simulation example of RSRP measurements for a dual-panel UE 10 moving from a Serving to Target cell. The time trace in FIG. 8 is generated via system-level simulations and illustrates the evolution of the RSRP measurements from both serving and target cells and shows that as long as the UE 10 is in good quality with respect to the serving beam/panel, there is no need to increase the measurement activity, i.e. UE 10 can skip measuring the target cell and measuring via panel 2 with no/minimal mobility impact when doing so. In FIG. 8, the RSRP values of the two panels of the UE for both Serving and Target cell are simulated over time. On the right hand side figures the key observation is that the curves A, B represent all the measurements without filtering (on above right figure) or with L3 filtering (below right figure) versus the measurement that skip 3 measurements (out of 4 SSBs) and hold the value. The main conclusion is that these measurements are quasi-equivalent and that it is possible to skip measurements of panels if done appropriately. The figures show the L1-RSRP values with different multiple antenna panel UE (MPUE) settings where:

S(erving) P1 (P2) L1 (L3) RSRP: Serving cell, Serving Beam, UE panel1 (panel2) RSRP measurements for all SSBs.

T(arget) P1 (P2) L1 (L3) RSRP: Target cell, Target Beam, UE panel1 (panel2) RSRP measurements for all SSBs.

A1 (A3) RR S(erving) P1 (P2) L1 (L3) RSRP: Serving cell, Serving Beam, UE panel1 (panel2) RSRP measurements for every 4 SSBs (assuming a round robin MPUE assumption UE measuring one panel at the time with 4 UE panels).

A1 (A3) RR T(arget) P1 (P2) L1 (L3) RSRP: Target cell, Target Beam, UE panel1 (panel2) RSRP measurements for every 4 SSBs (assuming a round robin MPUE assumption UE measuring one panel at the time with 4 UE panels).

Although the embodiments mentioned above have been described considering an RRC Idle/Inactive UE, it will be appreciated that the same method could be used (at least partially) by an RRC Connected UE. It will be appreciated that based on the RRC state the UE is in, the UE may need to apply certain limitation to the proposed method in order to comply with the radio measurement requirements defined for a given RRC state, comprising for example a maximum cell detection delay, measurement reporting accuracy level, etc.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:
1. An apparatus, comprising:
at least one processor; and,
at least one memory storing instructions that, when executed by the at least one processor, cause the apparatus to at least:

obtain radio environment information related to at least one downlink signal received by a user equipment using at least one currently-active reception antenna panel of a plurality of selectively-activatable reception antenna panels; and reconfigure at least one of said plurality of selectively-activatable reception antenna panels to be used for performing radio measurements of a downlink signal to be one of active and inactive in response to a variation in said radio environment information, wherein the at least one memory and instructions, when executed by the at least one processor, cause the apparatus to reconfigure said at least one of said plurality of selectively-activatable reception antenna panels between a plurality of different predefined ordered active/inactive states, wherein each higher-ordered active/inactive state configures at least one of an increased number of active reception panels and an increased number of downlink signals to be measured compared to a lower-order active/inactive state.

2. The apparatus of claim 1, wherein said radio environment information is obtained from at least one of: a sensor on said user equipment; said radio measurements of said at least one downlink signal received by said user equipment using said at least one currently-active reception antenna panel; and from information from a base station providing said at least one downlink signal.

3. The apparatus of claim 1, wherein the at least one memory and instructions, when executed by the at least one processor, cause the apparatus to reconfigure said at least one of said plurality of selectively-activatable reception antenna panels between a plurality of different active/inactive states to vary at least one of a number of active reception antenna panels to be used for performing radio measurements and a number of downlink signals to be measured in response to said variation in said radio environment information.

4. The apparatus of claim 1, wherein the at least one memory and instructions, when executed by the at least one processor, cause the apparatus to reconfigure said at least one of said plurality of selectively-activatable reception antenna panels to a higher-ordered antenna panel configuration state from said ordered plurality of antenna panel configuration states to configure said at least one of plurality of antenna panels to increase temporarily a number of downlink signals to be measured.

5. The apparatus of claim 1, wherein the at least one memory and instructions, when executed by the at least one processor, cause the apparatus to reconfigure said at least one of said plurality of selectively-activatable reception antenna panels between said plurality of different ordered active/inactive states in response to said variation in said radio environment information indicating a change in signal quality of said at least one downlink signal received by said user equipment using said at least one currently-active reception antenna panel which is greater than a threshold amount, and wherein the at least one memory and instructions, when executed by the at least one processor, cause the apparatus to vary said threshold amount based on a proximity to a serving base station.

6. The apparatus of a claim 1, wherein the at least one memory and instructions, when executed by the at least one processor, cause the apparatus to reconfigure said at least one of said plurality of selectively-activatable reception antenna panels between said plurality of different ordered active/inactive states in response to said variation in said radio environment information indicating a change in a movement state of said user equipment, and wherein said movement state comprises at least one of movement and rotation of said user equipment.

7. The apparatus of claim 1, wherein the at least one memory and instructions, when executed by the at least one processor, cause the apparatus to reconfigure said at least one of said plurality of selectively-activatable reception antenna panels between said plurality of different ordered active/inactive states in response to said variation in said radio environment information indicating a change in a presence of a signal-blocking object between said user equipment and a base station transmitting said at least one downlink signal.

8. The apparatus of claim 1, wherein the at least one memory and instructions, when executed by the at least one processor, cause the apparatus to reconfigure said at least one of said plurality of selectively-activatable reception antenna panels to a higher-ordered active/inactive state to increase a number of downlink signals to be measured in response to said variation in said radio environment information indicating at least one of:
- a decrease in signal quality of said at least one downlink signal received by said user equipment using said at least one currently-active reception antenna panel;
- a decrease in signal quality of said at least one downlink signal received by said user equipment using said at least one currently-active reception antenna panel for a time period;
- that a signal-blocking object is near a base station providing said at least one downlink signal;
- that said user equipment is rotating;
- that said user equipment is moving;
- that said user equipment is moving greater than a threshold amount.

9. The apparatus of claim 1, wherein the at least one memory and instructions, when executed by the at least one processor, cause the apparatus to reconfigure said at least one of said plurality of selectively-activatable reception antenna panels to a higher-ordered active/inactive state to increase a number of active reception panels in response to said variation in said radio environment information indicating at least one of:
- that said user equipment is rotating greater than a threshold amount;
- that that a signal-blocking object is near said user equipment.

10. The apparatus of claim 1, wherein the at least one memory and instructions, when executed by the at least one processor, cause the apparatus to reconfigure said at least one of said plurality of selectively-activatable reception antenna panels to a lower-ordered active/inactive state to decrease a number of downlink signals to be measured in response to said variation in said radio environment information indicating at least one of:
- an increase in signal quality of said at least one downlink signal received by said user equipment using said at least one currently-active reception antenna panel;
- an increase in signal quality of said at least one downlink signal received by said user equipment using said at least one currently-active reception antenna panel for a time period;
- that no signal-blocking object is near a base station providing said at least one downlink signal;
- that said user equipment is not moving;
- that said user equipment is moving less than a threshold amount.

11. The apparatus of claim 1, wherein the at least one memory and instructions, when executed by the at least one processor, cause the apparatus to reconfigure said at least one of said plurality of selectively-activatable reception antenna panels to a lower-ordered active/inactive state to decrease a number of active reception panels in response to said variation in said radio environment information indicating at least one of:
- that said user equipment is not rotating;
- that said user equipment is rotating less than a threshold amount;
- that that no signal-blocking object is near said user equipment.

12. The apparatus of claim 1, wherein said radio environment information is obtained from at least one of a sensor on said user equipment, said radio measurements of said at least one downlink signal received by said user equipment using said at least one currently-active reception antenna panel and from information from a base station providing said at least one downlink signal.

13. A method, comprising:
- obtaining radio environment information related to at least one downlink signal received by a user equipment using at least one currently-active reception antenna panel of a plurality of selectively-activatable reception antenna panels; and
- reconfiguring at least one of said plurality of selectively-activatable reception antenna panels to be used for performing radio measurements of a downlink signal to be one of active and inactive in response to a variation in said radio environment information, wherein reconfiguring at least one of said plurality of selectively-activatable reception antenna panels comprises reconfiguring at least one of said plurality of selectively-activatable reception antenna panels between a plurality of different predefined ordered active/inactive states, wherein each higher-ordered active/inactive state configures at least one of an increased number of active reception panels and an increased number of downlink signals to be measured compared to a lower-order active/inactive state.

14. User equipment comprising:
at least one sensor;
a plurality of selectively-activatable reception antenna panels; and,
circuitry configured to—
obtain radio environment information related to at least one downlink signal received by the user equipment using at least one of one currently-active reception antenna panel of the plurality of selectively-activatable reception antenna panels, the at least one sensor, and information from a base station providing said at least one downlink signal, and
reconfigure at least one of said plurality of selectively-activatable reception antenna panels to be used for performing radio measurements of a downlink signal to be one of active and inactive in response to a variation in said radio environment information,
wherein the circuitry is further configured to reconfigure said at least one of said plurality of selectively-activatable reception antenna panels between a plurality of different predefined ordered active/inactive states, wherein each higher-ordered active/inactive state configures at least one of an increased number of active reception panels and an increased number of downlink signals to be measured compared to a lower-order active/inactive state.

15. The user equipment of claim 14, wherein the circuitry is configured to reconfigure said at least one of said plurality of selectively-activatable reception antenna panels between a plurality of different active/inactive states to vary at least one of a number of active reception antenna panels to be used for performing radio measurements and a number of downlink signals to be measured in response to said variation in said radio environment information.

16. The user equipment of claim 14, wherein the circuitry is configured to reconfigure said at least one of said plurality of selectively-activatable reception antenna panels to a higher-ordered antenna panel configuration state from said ordered plurality of antenna panel configuration states to configure said at least one of plurality of antenna panels to increase temporarily a number of downlink signals to be measured.

17. The user equipment of claim 14, wherein the circuitry is configured to reconfigure said at least one of said plurality of selectively-activatable reception antenna panels between said plurality of different ordered active/inactive states in response to said variation in said radio environment information indicating a change in signal quality of said at least one downlink signal received by said user equipment using said at least one currently-active reception antenna panel which is greater than a threshold amount, and wherein the circuitry is configured to vary said threshold amount based on a proximity to a serving base station.

18. The user equipment of claim 14, wherein the circuitry is configured to reconfigure said at least one of said plurality of selectively-activatable reception antenna panels between said plurality of different ordered active/inactive states in response to said variation in said radio environment information indicating a change in a movement state of said user equipment, and wherein said movement state comprises at least one of movement and rotation of said user equipment.

19. The user equipment of claim 14, wherein the circuitry is configured to reconfigure said at least one of said plurality of selectively-activatable reception antenna panels between said plurality of different ordered active/inactive states in response to said variation in said radio environment information indicating a change in a presence of a signal-blocking object between said user equipment and the base station transmitting said at least one downlink signal.

* * * * *